United States Patent
Kumfer et al.

(10) Patent No.: US 7,589,942 B2
(45) Date of Patent: Sep. 15, 2009

(54) MEMS BASED MOTOR STARTER WITH MOTOR FAILURE DETECTION

(75) Inventors: Brent Charles Kumfer, Farmington, CT (US); William James Premerlani, Scotia, NY (US); Robert Joseph Cagglano, Wolcott, CT (US); Kanakasabapathi Subramanian, Clifton Park, NY (US); David James Lesslie, Plainville, CT (US)

(73) Assignee: General Electric Company, Schenectady, NY (US)

( * ) Notice: Subject to any disclaimer, the term of this patent is extended or adjusted under 35 U.S.C. 154(b) by 179 days.

(21) Appl. No.: 11/763,646

(22) Filed: Jun. 15, 2007

(65) Prior Publication Data

US 2008/0310057 A1    Dec. 18, 2008

(51) Int. Cl.
*F21V 7/04* (2006.01)
*H02H 5/04* (2006.01)
*H02H 7/08* (2006.01)

(52) U.S. Cl. .............................. 361/31; 361/2; 318/474
(58) Field of Classification Search ................... 361/31, 361/2; 318/474
See application file for complete search history.

(56) References Cited

U.S. PATENT DOCUMENTS

| | | |
|---|---|---|
| 3,496,409 A | 2/1970 | Connell ........................ 315/36 |
| 4,384,289 A | 5/1983 | Stillwell et al. |
| 4,723,187 A | 2/1988 | Howell |
| 4,827,272 A | 5/1989 | Davis |
| 4,847,780 A | 7/1989 | Gilker et al. |
| 5,374,792 A | 12/1994 | Ghezzo et al. |
| 5,426,360 A | 6/1995 | Maraio et al. |
| 5,430,597 A | 7/1995 | Bagepalli et al. .............. 361/93 |
| 5,454,904 A | 10/1995 | Ghezzo et al. |
| 5,502,374 A | 3/1996 | Cota |
| 5,889,643 A | 3/1999 | Elms |
| 5,940,260 A | 8/1999 | Gelbien et al. |

(Continued)

FOREIGN PATENT DOCUMENTS

DE    19850397 A1    5/2000

(Continued)

OTHER PUBLICATIONS

"Power Circuit Breaker Using Micro-Mechanical Switches"; Authors: George G. Karady and Gerald Thomas Heydt; Int J. Critical Infrastructure, vol. 3, Nos. 1/2, 2007; pp. 88-100; XP008087882.

(Continued)

*Primary Examiner*—Bentsu Ro
*Assistant Examiner*—Erick Glass
(74) *Attorney, Agent, or Firm*—Cantor Colburn LLP

(57) ABSTRACT

A motor starter is disclosed. The motor starter includes control circuitry integrally arranged with at least one current path and a processor included in the control circuitry. The motor starter further includes at least one processor algorithm residing on the processor, the at least one processor algorithm containing instructions to monitor characteristics of current on the at least one current path and to provide data pertaining to a condition of the at least one current path. The motor starter further includes a micro electromechanical system (MEMS) switch disposed on the at least one current path, the MEMS switch responsive to the control circuitry to facilitate the control of an electrical current, passing through the at least one current path.

18 Claims, 7 Drawing Sheets

U.S. PATENT DOCUMENTS

| | | | |
|---|---|---|---|
| 5,943,223 | A | 8/1999 | Pond |
| 5,973,896 | A | 10/1999 | Hirsh et al. |
| 6,054,659 | A | 4/2000 | Lee et al. |
| 6,275,366 | B1 | 8/2001 | Gelbien et al. |
| 6,563,683 | B1 | 5/2003 | Strumpler ............... 361/93.1 |
| 6,738,246 | B1 | 5/2004 | Strumpler ............... 361/93.1 |
| 6,904,471 | B2 | 6/2005 | Boggs et al. ................. 710/8 |
| 7,111,195 | B2 * | 9/2006 | Berkcan et al. ............ 714/12 |
| 2001/0014949 | A1 | 8/2001 | Leblanc |
| 2002/0008149 | A1 | 1/2002 | Riley et al. |
| 2002/0145841 | A1 | 10/2002 | Williams et al. |
| 2003/0050737 | A1 | 3/2003 | Osann, Jr. |
| 2003/0212473 | A1 | 11/2003 | Vandevanter |
| 2004/0032320 | A1 | 2/2004 | Zalitzky et al. |
| 2004/0113713 | A1 | 6/2004 | Zipper et al. |
| 2004/0263125 | A1 | 12/2004 | Kanno et al. |
| 2005/0085928 | A1 | 4/2005 | Shani ............................ 700/18 |
| 2005/0248340 | A1 | 11/2005 | Berkcan et al. ............ 324/259 |
| 2005/0270014 | A1 | 12/2005 | Zribi et al. |
| 2006/0121785 | A1 | 6/2006 | Caggiano et al. |
| 2006/0187688 | A1 | 8/2006 | Tsuruya ................... 363/56.12 |
| 2006/0202933 | A1 | 9/2006 | Pasch et al. ................... 345/94 |
| 2007/0013357 | A1 | 1/2007 | Huang et al. ................. 323/318 |
| 2007/0057746 | A1 | 3/2007 | Rubel |
| 2007/0142938 | A1 | 6/2007 | Huang .......................... 700/40 |
| 2007/0173960 | A1 | 7/2007 | Kumar .......................... 700/40 |
| 2008/0309438 | A1 * | 12/2008 | Caggiano et al. ............. 335/78 |
| 2008/0310056 | A1 * | 12/2008 | Kumfer et al. ................. 361/6 |
| 2008/0310062 | A1 * | 12/2008 | Kumfer et al. ................ 361/62 |

FOREIGN PATENT DOCUMENTS

| | | |
|---|---|---|
| DE | 19927762 A1 | 1/2001 |
| EP | 0072422 A1 | 2/1983 |
| EP | 0233756 A1 | 8/1987 |
| EP | 0774822 A1 | 5/1997 |
| EP | 1255268 A1 | 11/2002 |
| EP | 1610142 A1 | 12/2005 |
| EP | 1643324 A2 | 4/2006 |
| EP | 1681694 A1 | 7/2006 |
| GB | 2123627 A | 2/1984 |
| WO | 9946606 A2 | 9/1999 |
| WO | 0004392 A1 | 1/2000 |
| WO | 2006078944 A2 | 7/2006 |
| WO | 2006100192 A1 | 9/2006 |

OTHER PUBLICATIONS

"MEMS Based Electronic Circuit Breaker as a Possible Component for and Electrical Ship", Authors: George G. Karady and Gerald T. Heydt; IEEE Electric Ship Technologies Symposium, 2005; pp. 214-218; XP-002468154.

"Advanced MEMS for High Power Integrated Distribution Systems"; Authors: Rahim Kasim, Bruce C. Kim and Josef Drobnik; IEEE Computer; Proceedings of the International Conference on MEMS, NANO and Smart Systems, 2005; pp. 1-6.

PCT International Search Report; International Application No. PCT/US2007/014379; International Filing Date Jun. 20, 2007; Date of Mailing Feb. 11, 2008.

PCT International Search Report; International Application No. PCT/US2007/071644; International Filing Date Jun. 20, 2007; Date of Mailing Feb. 13, 2008.

PCT International Search Report; International Application No. PCT/US2007/071624; International Filing Date Jun. 20, 2007; Date of Mailing Feb. 18, 2008.

PCT International Search Report; International Application No. PCT/US2007/071627; International Filing Date Jun. 20, 2007; Date of Mailing Feb. 29, 2008.

PCT International Search Report; International Application No. PCT/US2007/071630; International Filing Date Jun. 20, 2007; Date of Mailing Mar. 7, 2008.

PCT Written Opinion of the International Searching Authority; International Application No. PCT/US2007/071630; International Filing Date Jun. 20, 2007; Date of Mailing Mar. 7, 2008.

PCT International Search Report; International Application No. PCT/US2007/071632; International Filing Date Jun. 20, 2007; Date of Mailing Feb. 29, 2008.

PCT Written Opinion of the International Searching Authority; International Application No. PCT/US2007/071632; International Filing Date Jun. 20, 2007; Date of Mailing Feb. 29, 2008.

PCT International Search Report; International Application No. PCT/US2007/014363; International Filing Date Jun. 20, 2007; Date of Mailing Mar. 4, 2008.

PCT International Search Report; International Application No. PCT/US2007/071656; International Filing Date Jun. 20, 2007; Date of Mailing Mar. 12, 2008.

PCT International Search Report; International Application No. PCT/US2007/071654; International Filing Date Jun. 20, 2007; Date of Mailing Mar. 13, 2008.

PCT International Search Report; International Application No. PCT/US2007/014362; International Filing Date Jun. 20, 2007; Date of Mailing Mar. 20, 2008.

PCT International Search Report; International Application No. PCT/US2007/071643; International Filing Date Jun. 20, 2007; Date of Mailing Feb. 8, 2008.

PCT Written Opinion of the International Searching Authority; International Application No. PCT/US2007/071643; International Filing Date Jun. 20, 2007; Date of Mailing Feb. 8, 2008.

European Search Report for European Application No. 07110554.8; European Filing Date of Oct. 19, 2007; Mailing Date of Oct. 30, 2007; (6 pgs).

USPTO Office Action dated Oct. 17, 2008; Filing Date: Jun. 19, 2007; First Named Inventor: William James Premerlani.

USPTO Office Action dated Oct. 24, 2008; Filing Date: Jun. 15, 2007; First Named Inventor: William James Permerlani.

USPTO Office Action dated Oct. 28, 2008; Filing Date: Jun. 8, 2007; First Named Inventor: Cecil Rivers, Jr.

George G. Karady and G.T. Hevdt, "Novel Concept for Medium Voltage Circuit Breakers Using Microswitches." IEEE Transactions On Power Delivery, vol. 21, No. 1., Jan. 2006, pp. 536-537.

* cited by examiner

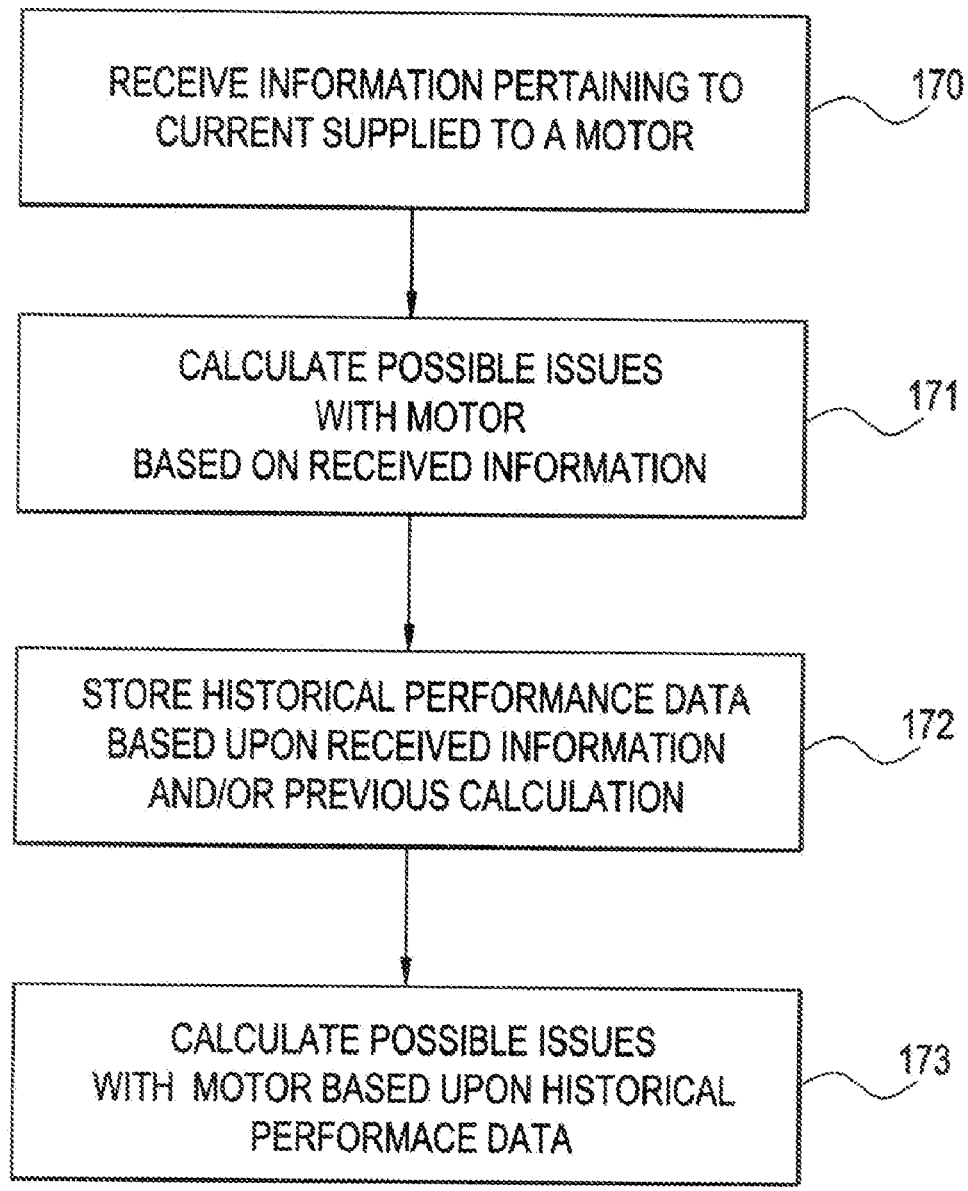

US 7,589,942 B2

MEMS BASED MOTOR STARTER WITH MOTOR FAILURE DETECTION

BACKGROUND OF THE INVENTION

Embodiments of the invention relate generally to a switching device for switching on/off a current in a current path, and more particularly to micro-electromechanical system based switching devices.

A contactor is an electrical device designed to switch an electrical load ON and OFF on command. Traditionally, electromechanical contactors are employed in control gear, where the electromechanical contactors are capable of handling switching currents up to their interrupting capacity. Electromechanical contactors may also find application in power systems for switching currents and in industrial automation systems as motor starters. However, motors controlled by the contactors may fall under a variety of circumstances and fault currents in power systems are typically greater than the interrupting capacity of the electromechanical contactors. Accordingly, to employ electromechanical contactors in power system applications, it may be desirable to protect the contactor from damage by backing it up with a series device that is sufficiently fast acting to interrupt fault currents prior to the contactor opening at all values of current above the interrupting capacity of the contactor. Further, it may be desirable to detect issues with a motor before a costly breakdown occurs.

With regards to early warning motor protection, previously conceived solutions involved costly monitoring of motors by skilled technicians and/or providing complex motor monitoring equipment alongside already bulky motor starters. For example, conventional motor starters include a set of contacts to control current flow. Some motor starters may further include thermal overload protection and/or a local disconnect. However, conventional motor starters lack control circuitry or logical controls integrated thereon. Therefore, monitoring by skilled technicians may include costly downtime of motor starter equipment and undesirable safety issues. For example, in order to monitor a conventional motor starter, a skilled technician may have to physically inspect the device. Therefore, in order to monitor the motor controlled by the conventional motor starter, a skilled technician may have to physically monitor the motor connections on the motor starter and/or motor itself.

If additional monitoring circuitry is used, such additional circuitry would be in addition to a stand-alone motor starter, it is appreciated that givers the often limited space of conventional control panels or motor control cabinets, additional monitoring equipment would hinder visual inspection and decrease space for future integration needs. Therefore, conventional approaches to early warning motor protection have many drawbacks.

With regards to interrupting capacity issues, previously conceived solutions to facilitate use of contactors in power systems include vacuum contactors, vacuum interrupters and air break contactors, for example. Unfortunately, contactors such as vacuum contactors do not lend themselves to easy visual inspection as the contactor tips are encapsulated in a sealed, evacuated enclosure. Further, while the vacuum contactors are well suited for handling the switching of large motors, transformers and capacitors, they are known to cause undesirable transient overvoltages, particularly when the load is switched off.

Furthermore, the electromechanical contactors generally use mechanical switches. However, as these mechanical switches tend to switch at a relatively slow speed, predictive techniques are employed in order to estimate occurrence of a zero crossing, often tens of milliseconds before the switching event is to occur, in order to facilitate opening/closing at the zero crossing for reduced arcing. Such zero crossing prediction is prone to error as many transients may occur in this prediction time interval.

As an alternative to slow mechanical and electromechanical switches, last solid-state switches have been employed in high speed switching applications. As will be appreciated, these solid-state switches switch between a conducting state and a non-conducting state through controlled application of a voltage or bias, for example, by reverse biasing a solid-state switch, the switch may be transitioned into a non-conducting state. However, since solid-state switches do not create a physical gap between contacts when they are switched into a non-conducing state, they experience leakage current. Furthermore, due to internal resistances, when solid-state switches operate in a conducting state, they experience a voltage drop. Both the voltage drop and leakage current contribute to the generation of excess neat under normal operating circumstances, which may affect switch performance and life. Moreover, due at least in part to the inherent leakage current associated with solid-state switches, their use in circuit breaker applications is not practical.

Accordingly, there exists a need in the art for a current switching circuit protection arrangement and reliable early warning motor protection to overcome these drawbacks.

BRIEF DESCRIPTIONS OF THE INVENTION

An embodiment of the invention includes a motor starter. The motor starter includes control circuitry integrally arranged with at least one current path and a processor included in the control circuitry. The motor starter further includes at least one processor algorithm residing on the processor, the at least one processor algorithm containing instructions to monitor characteristics of current, on the at least one current path and to provide data pertaining to a condition of the at least one current path. The motor starter further includes a micro electromechanical system (MEMS) switch disposed on the at least one current path, the MEMS switch responsive to the control circuitry to facilitate the control of an electrical current passing through the at least one current path.

Another embodiment of the invention includes a method of early warning motor protection. The method includes receiving information at a processor pertaining to an electrical current on a current path integrally arranged with control circuitry, the control circuitry including the processor and configured to control the electrical current with a micro electromechanical system (MEMS) switch responsive to the control circuitry. The method further includes calculating a condition of the current path at the processor based on the received information.

BRIEF DESCRIPTION OP THE DRAWINGS

These and other features, aspects, and advantages of the present invention will become better understood if the following detailed description is read with reference to the accompanying drawings in which like characters represent like parts throughout the drawings, wherein:

FIG. 8 is a flowchart illustrating a method of early warning motor protection in accordance with embodiments of the invention.

DETAILED DESCRIPTION OF THE INVENTION

An embodiment of the invention provides a motor starter with early warning motor protection. The proposed motor starter includes a processor within control circuitry with processor algorithms to determine the possibility of a problem with a motor. Use of micro electromechanical system (MEMS) switches in the motor starter provide fast response time, thereby facilitating diminishing the let-through energy of an interrupted fault. A Hybrid Arcless Limiting Technology (BALI) circuit connected in parallel with the MEMS switches provides capability for the MEMS switches to be opened or closed without arcing at any given time regardless of current or voltage. Therefore, embodiments of the invention provide a motor starter with advantages over conventional systems.

Figure 1:
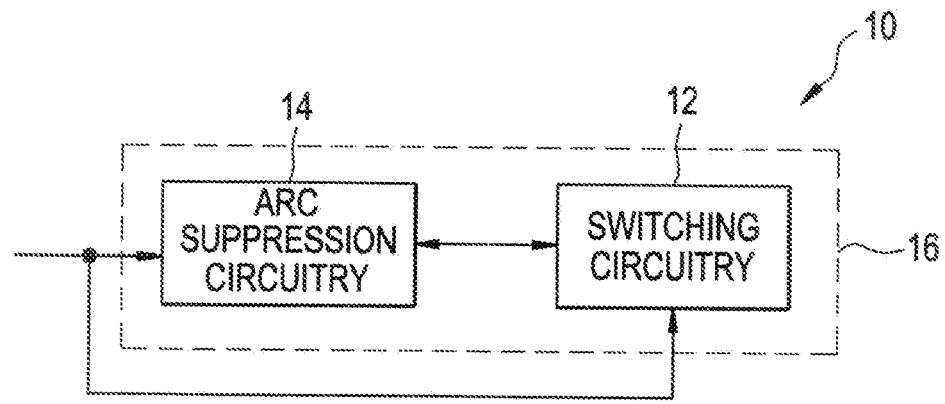
FIG. 1 is a block diagram of an exemplary ME MS based switching system in accordance with an embodiment of the invention.

FIG. 1 illustrates a block diagram of an exemplary arc-less micro-electromechanical system switch (MEMS) based switching system 10, in accordance with aspects of the present invention. Presently. MEMS generally refer to micron-scale structures that for example can integrate a multiplicity of functionally distinct elements, for example, mechanical elements, electromechanical elements, sensors, actuators, and electronics, on a common substrate through micro-fabrication technology. It is contemplated, however, that many techniques and structures presently available in MEMS devices will in just a few years be available via nanotechnology-based devices, for example, structures that may be smaller than 100 nanometers in size. Accordingly, even though example embodiments described throughout this document may refer to MEMS-based switching devices, it is submitted that the inventive aspects of the present invention should be broadly construed and should not be limited to micron-sized devices.

As illustrated in FIG. 1, the arc-less MEMS based switching system 10 is shown as including MEMS based switching circuitry 12 and arc suppression circuitry 14, where the arc suppression circuitry 14, alternatively referred to as a Hybrid Arcless Limiting Technology (HALT) device, is operatively coupled to the MEMS based switching circuitry 12. In certain embodiments, the MEMS based switching circuitry 12 may be integrated in its entirety with the arc suppression circuitry 14 in a single package 16, for example. In other embodiments, only certain portions or components of the MEMS based switching circuitry 12 may be integrated with the arc suppression circuitry 14.

In a presently contemplated configuration as will be described in greater detail with reference to FIG. 2, the MEMS based switching circuitry 12 may include one or more MEMS switches. Additionally, the arc suppression circuitry 14 may include a balanced diode bridge and a pulse circuit. Further, tire arc suppression circuitry 14 may be configured to facilitate suppression of an arc formation between contacts of the one or more MEMS switches by receiving a transfer of electrical energy from the MEMS switch in response to the MEMS switch changing state from closed to open. It may be noted that the are suppression circuitry 14 may be configured to facilitate suppression of an arc formation in response to an alternating current (AC) or a direct current (DC).

Figure 2:
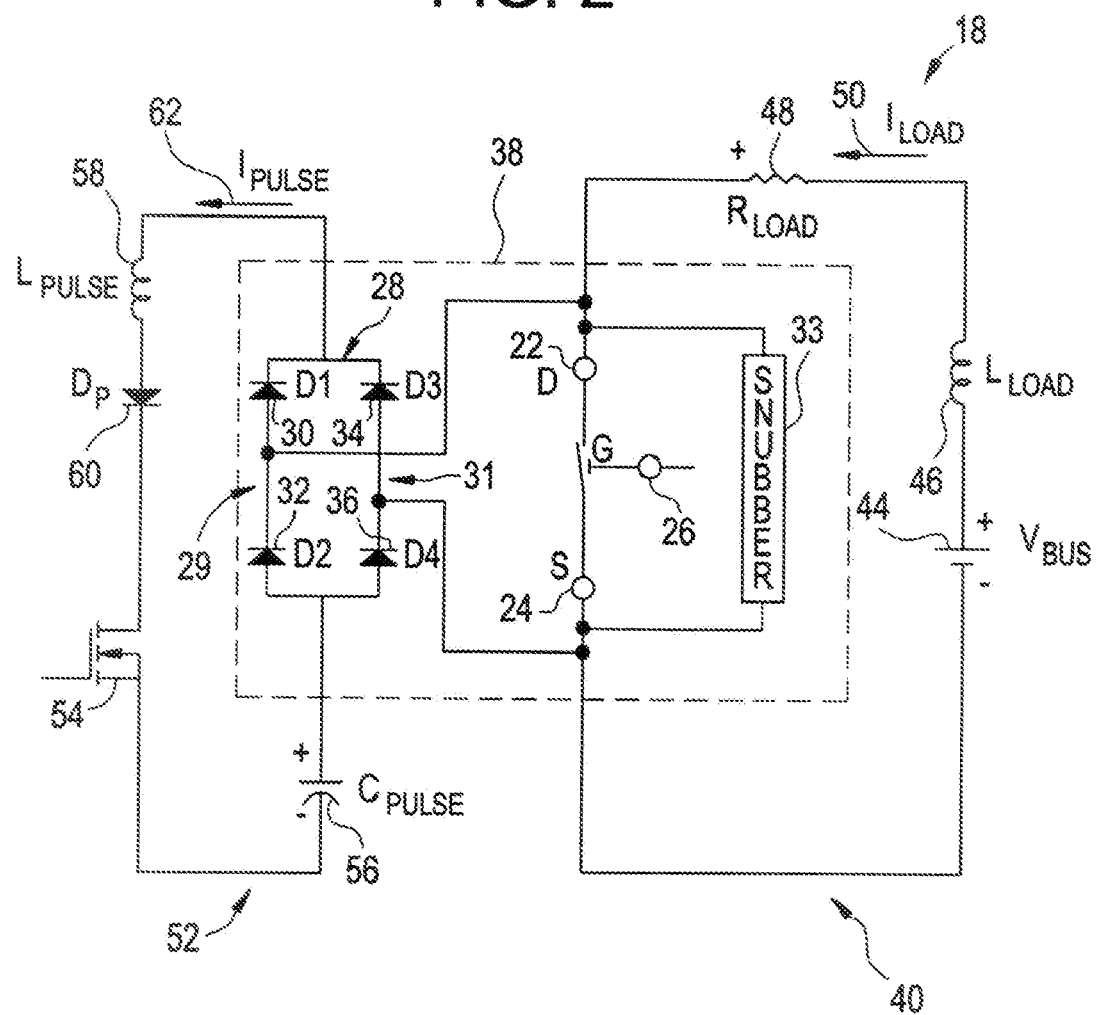
FIG. 2 is schematic diagram illustrating the exemplary MEMS based switching system depicted in FIG. 1.
Figure 4:
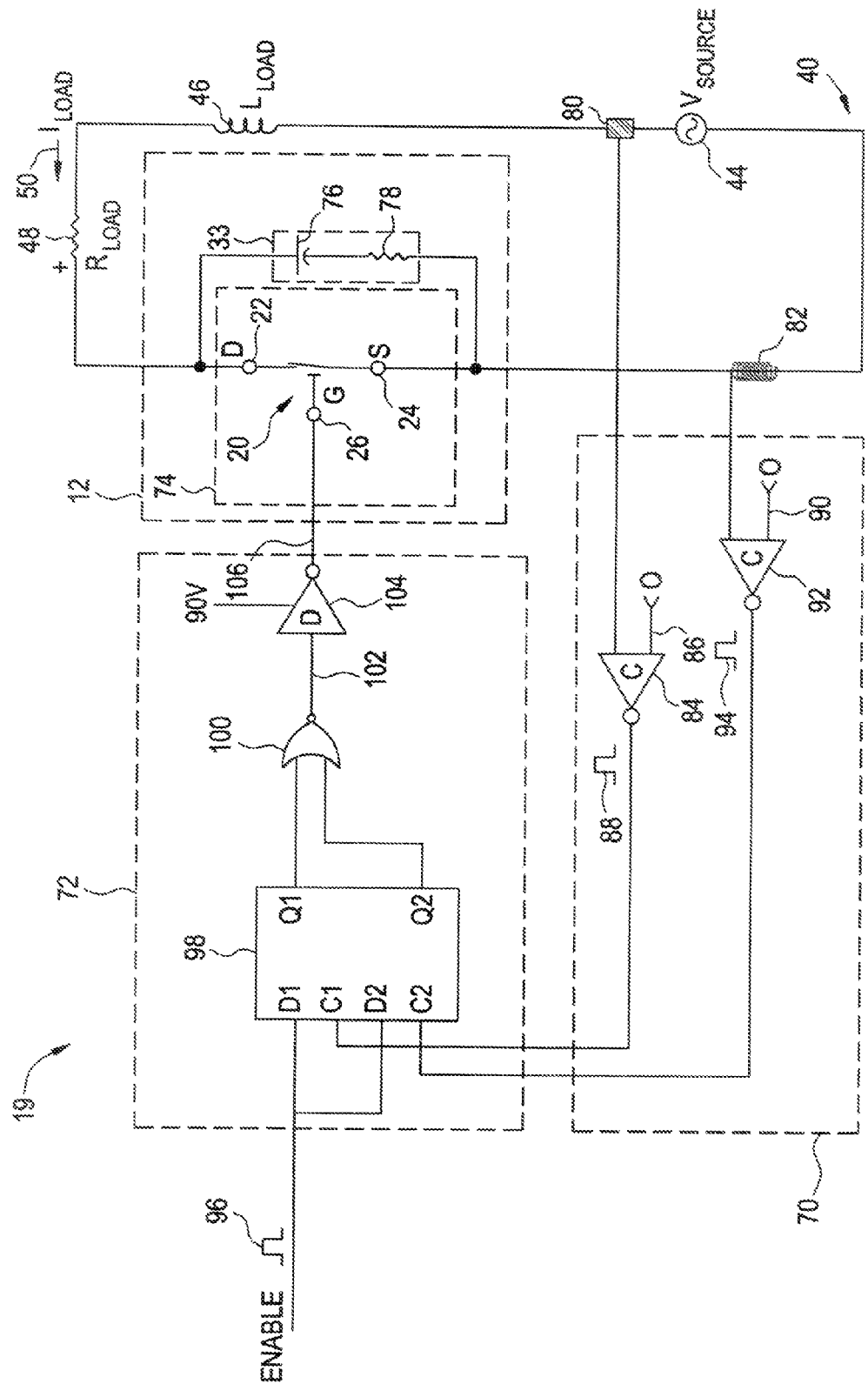
FIG. 4 is a schematic diagram illustrating the exemplary MEMS based switching system depicted in FIG. 3.

Turning now to FIG. 2, a schematic diagram 18 of the exemplary arc-less MEMS based switching system depicted in FIG. 1 is illustrated in accordance with one embodiment. As noted with reference to FIG. 1, the MEMS based switching circuitry 12 may include one or more MEMS switches. In the illustrated embodiment, a first MEMS switch 20 is depicted as having a first contact 22, a second contact 24 and a third contact 26. In one embodiment, the first contact 22 may be configured as a drain, the second contact 24 may be configured as a source and the third contact 26 may be configured as a gate. Furthermore, as illustrated in FIG. 2, a voltage snubber circuit 33 may be coupled in parallel with the MEMS switch 20 and configured to limit voltage overshoot during fast contact separation as will be explained in greater detail hereinafter. In certain embodiments, the snubber circuit 33 may include a snubber capacitor (see 76. FIG. 4) coupled in series with a snubber resistor (see 78, FIG. 4). The snubber capacitor may facilitate improvement in transient voltage sharing during the sequencing of the opening of the MEMS switch 20. Furthermore, the snubber resistor may suppress any pulse of current generated by the snubber capacitor during closing operation of the MEMS switch 20. In certain other embodiments, the voltage snubber circuit 33 may include a metal oxide varistor (MOV) (not shown).

In accordance with further aspects of the present technique, a load circuit 40 may be coupled in series with the first MEMS switch 20. The load circuit 40 may include a voltage source $V_{BUS}$ 44. In addition, the load circuit 40 may also include a load inductance 46 $L_{LOAD}$, where the load inductance $L_{LOAD}$ 46 is representative of a combined load inductance and a bus inductance viewed by the load circuit 40. The load circuit 40 may also include a load resistance $R_{LOAD}$ 48 representative of a combined load resistance viewed by the load circuit 40. Reference numeral 50 is representative of a load circuit current $L_{LOAD}$ that may flow through the load circuit 40 and the first MEMS switch 20.

Further, as noted with reference to FIG. 1, the are suppression circuitry 14 may include a balanced diode bridge. In the illustrated embodiment; a balanced diode bridge 28 is depicted as having a first branch 29 and a second branch 31. As used herein, the term "balanced diode bridge" is used to represent a diode bridge that is configured such that voltage drops across both the first and second branches 29, 31 are substantially equal. The first branch 20 of the balanced diode bridge 28 may include a first diode D1 30 and a second diode D2 32 coupled together to form a first series circuit. In a similar fashion, the second branch 31 of the balanced diode bridge 28 may include a third diode D3 34 and a fourth diode D4 36 operatively coupled together to form a second series circuit.

In one embodiment, the first MEMS switch 20 may be coupled in parallel across midpoints of the balanced diode bridge 28. The midpoints of the balanced diode bridge may include a first midpoint located between the first and second diodes 30, 32 and a second midpoint located between the third and fourth diodes 34, 36. Furthermore, the first MEMS switch 20 and the balanced diode bridge 28 may be tightly packaged to facilitate minimization of parasitic inductance caused by the balanced diode bridge 28 and lit particular, the connections to the MEMS switch 20. It may be noted that, in accordance with exemplary aspects of the present technique, the first MEMS switch 20 and the balanced diode bridge 28 are positioned relative to one another such that the inherent inductance between the first MEMS switch 20 and the balanced diode bridge 28 produces a di/dt voltage less than a few percent of the voltage across the drain 22 and source 24 of the MEMS switch 20 when carrying a transfer of the load current to the diode bridge 28 during the MEMS switch 20 turn-off which will be described in greater detail hereinafter, in one embodiment the first MEMS switch 20 may be integrated with the balanced diode bridge 28 in a single package 38 or optionally, the same die with the intention of minimizing the inductance interconnecting the MEMS switch 20 and the diode bridge 28.

Additionally, the arc suppression circuitry 14 may include a pulse circuit 52 coupled in operative association with the balanced diode bridge 28. The pulse circuit 52 may be configured to detect a switch condition and initiate opening of the MEMS switch 20 responsive to the switch condition. As used herein, the term "switch condition" refers to a condition that triggers changing a present operating state of the MEMS switch 20. For example, the switch condition may result in changing a first closed state of the MEMS switch 20 to a second open state or a first open state of the MEMS switch 20 to a second closed state. A switch condition may occur in response to a number of actions including but not limited to a circuit fault or switch ON/OFF request.

The pulse circuit 32 may include a pulse switch 54 and a pulse capacitor $C_{PULSE}$ series coupled to the pulse switch 54. Further, the pulse circuit may also include a pulse inductance $L_{PULSE}$ 58 and a first diode $D_P$ 60 coupled in series with the pulse switch 54. The pulse inductance $L_{PULSE}$ 58, the diode $D_P$ 60, the pulse switch 54 and the pulse capacitor $C_{PULSE}$ 56 may be coupled in series to form a first branch of the pulse circuit 52, where the components of the first branch may be configured to facilitate pulse current shaping and timing. Also, reference numeral 62 is representative of a pulse circuit current $I_{PULSE}$ that may flow through the pulse circuit 52.

In accordance with aspects of the present invention, the MEMS switch 20 may be rapidly switched (for example, on the order of picoseconds or nanoseconds) from a first closed state to a second open state while carrying a current albeit at a near-zero voltage. This may be achieved through the combined operation of the load circuit 40, and pulse circuit 52 including the balanced diode bridge 28 coupled in parallel across contacts of the MEMS switch 20.

Figure 3:
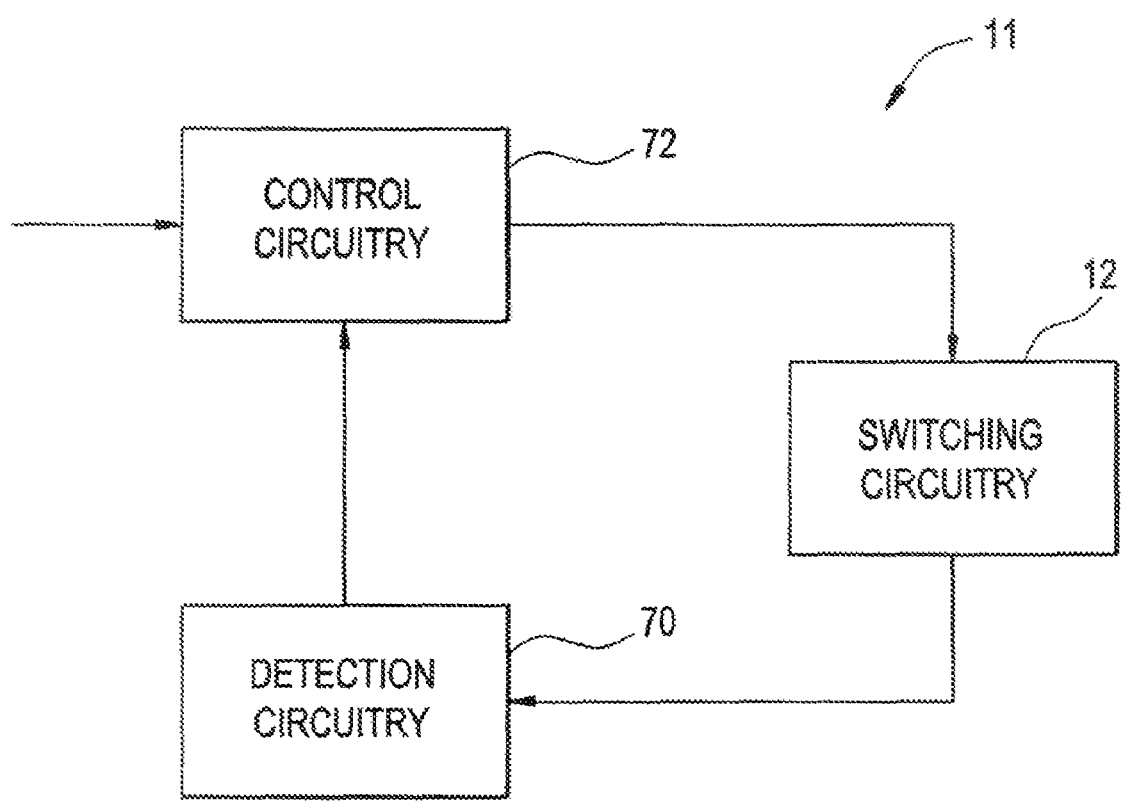
FIG. 3 is a block diagram of an exemplary MEMS based switching system in accordance with an embodiment of the invention and alternative to the system depleted in FIG. 1.

Reference is now made to FIG. 3, which illustrates a block diagram of an exemplary soft switching system 11, in accordance with aspects of the present invention. As illustrated in FIG. 3, the soft switching system 11 includes switching circuitry 12, detection circuitry 70, and control circuitry 72 operatively coupled together. The detection circuitry 70 may be coupled to the switching circuitry 12 and configured to detect an occurrence of a zero crossing of an alternating source voltage in a load circuit (hereinafter "source voltage") or an alternating current in the load circuit (hereinafter referred to as "load circuit current"), The control circuitry 72 may be coupled to the switching circuitry 12 and the detection circuitry 70, and may be configured to facilitate arc-less switching of one or more switches in the switching circuitry 12 responsive to a detected zero crossing of the alternating source voltage or the alternating load circuit current, in one embodiment, the control circuitry 72 may be configured to meditate arc-less switching of one or more MEMS switches comprising at least part of the switching circuitry 12.

In accordance with one aspect of the invention, the soft switching system 11 may be configured to perform soft or point-on-wave (PoW) switching whereby one or more MEMS switches in the switching circuitry 12 may be closed at a time when the voltage across the switching circuitry 12 is at or very close to zero, and opened at a time when the current through the switching circuitry 12 is at or close to zero. By closing the switches at a time when the voltage across the switching circuitry 12 is at or very close to zero, pre-strike arcing can be avoided by keeping the electric field low between the contacts of the one or more MEMS switches as they close, even if multiple switches do not all close at the same time. Similarly, by opening the switches at a time when the current through the switching circuitry 12 is at or close to zero, the soft switching system 11 can be designed so that the current in the last switch to open in the switching circuitry 12 falls within the design capability of the switch. As alluded to above and in accordance with one embodiment, the control circuitry 72 may be configured to synchronize the opening and closing of the one or more MEMS switches of the switching circuitry 12 with the occurrence of a zero crossing of an alternating source voltage or an alternating load circuit current.

Turning to FIG. 4, a schematic diagram 19 of one embodiment of the soft switching system 11 of FIG. 3 is illustrated, in accordance with the illustrated embodiment, the schematic diagram 19 includes one example of the switching circuitry 12, the detection circuitry 70 and the control circuitry 72.

Although for the purposes of description, FIG. 4 illustrates only a single MEMS switch 20 in switching circuitry 12, She switching circuitry 12 may nonetheless include multiple MEMS switches depending upon, for example, the current and voltage handling requirements of the soft switching system 11. In one embodiment, the switching circuitry 12 may include a switch module including multiple MEMS switches coupled together in a parallel configuration to divide the current amongst the MEMS switches, in another embodiment the switching circuitry 12 may include an array of MEMS switches coupled in a series configuration to divide the voltage amongst the MEMS switches, in yet a further embodiment, the switching circuitry 12 may include an array of MEMS switch modules coupled together in a series configuration to concurrently divide the voltage amongst she MEMS switch modules and divide the current amongst the MEMS switches in each module, in one embodiment, the one or more MEMS switches of the switching circuitry 12 may be integrated into a single package 74.

The exemplary MEMS switch 20 may include three contacts, in one embodiment, a first contact may be configured as a drain 22, a second contact may be configured as a source 24, and the third contact may be configured as a gate 26. In one embodiment, the control circuitry 72 may be coupled to the gate contact 26 to facilitate switching a current state of the MEMS switch 20. Also, in certain embodiments, damping circuitry (snubber circuit) 33 may be coupled in parallel with the MEMS switch 20 to delay appearance of voltage across the MEMS switch 20. As Illustrated, the damping circuitry 33 may include a snubber capacitor 70 coupled in series with a snubber resistor 78, for example.

Additionally, the MEMS switch 20 may be coupled in series with a load circuit 40 as further illustrated in FIG. 4. In a presently contemplated configuration, the load circuit 40 may include a voltage source $V_{SOURCE}$ 44, and may possess a representative load inductance $L_{LOAD}$ 46 and a load resistance $R_{LOAD}$ 48. In one embodiment, the voltage source $V_{SOURCE}$ 44 (also referred to as an AC voltage source) may be configured to generate the alternating source voltage and the alternating load current $I_{LOAD}$ 50. For example, a load may include an AC motor or similar device.

As previously noted, the detection circuitry 70 may be configured to detect occurrence of a zero crossing of the alternating source voltage or the alternating load current $I_{LOAD}$ 50 in the load circuit 40. The alternating source voltage may be sensed via the voltage sensing circuitry 80 and the alternating load current $I_{LOAD}$ 50 may be sensed via the current sensing circuitry 82. The alternating source voltage and the alternating load current may be sensed continuously or at discrete periods for example.

A zero crossing of the source voltage may be detected through, for example, use of a comparator such as tire illustrated zero voltage comparator 84. The voltage sensed by the voltage sensing circuitry 80 and a zero voltage reference 86 may be employed as inputs to the zero voltage comparator 84. In turn, an output signal 88 representative of a zero crossing of the source voltage of the load circuit 40 may be generated. Similarly, a zero crossing of the load current $I_{LOAD}$ 50 may also be detected through use of a comparator such as the illustrated zero current comparator 92. The current sensed by the current sensing circuitry 82 and a zero current reference 40 may be employed as inputs to the zero current comparator 92. In turn, an output signal 94 representative of a zero crossing of the load current $I_{LOAD}$ 50 may be generated.

The control circuitry 72, may in turn utilize the output signals 88 and 94 to determine when to change (for example, open or close) the current operating state of the MEMS switch 20 (or array of MEMS switches). More specifically, the control circuitry 72 may be configured to facilitate opening of the MEMS switch 20 in an arc-less manner to interrupt or open the load circuit 40 responsive to a detected zero crossing of the alternating load current $I_{LOAD}$ 50. Additionally, the control circuitry 72 may be configured to facilitate closing of the MEMS switch 20 in an arc-less manner to complete the load circuit 40 responsive to a detected zero crossing of the alternating source voltage.

In one embodiment, the control circuitry 72 may determine whether to switch the present operating state of the MEMS switch 20 to a second operating state based at least in part upon a state of an Enable signal 96. The Enable signal 96 may be generated as a result of a power off command in a contactor application, for example, or a power of Eon command in a motor starter application, in one embodiment the Enable signal 96 and the output signals 88 and 94 may be used as input signals to a dual 13 flip-flop 98 as shown. These signals may be used to close the MEMS switch 20 at a first source voltage zero after the Enable signal 9b is made active (for example, rising edge triggered), and to open the MEMS switch 20 at the first load current zero after the Enable signal 96 is deactivated (for example, falling edge triggered). With respect to the illustrated schematic diagram 19 of FIG. 4, every time the Enable signal 96 is active (either high or low depending upon the specific implementation) and either output signal 88 or 94 indicates a sensed voltage or current zero, a trigger signal 102 may be generated. In one embodiment, the trigger signal 102 may be generated via a NOR gate 100, for example. The trigger signal 102 may in turn be passed through a MEMS gate driver 104 to generate a gate activation signal 106 which may be used to apply a control voltage to the gate 26 of the MEMS switch 20 (or gates in the case of a MEMS array).

As previously noted, in order to achieve a desirable current rating for a particular application, a plurality of MEMS switches may be operatively coupled in parallel (for example, to form a switch module) in lieu of a single MEMS switch. The combined capabilities of the MEMS switches may be designed to adequately carry the continuous and transient overload current levels that may be experienced by the load circuit. For example, with a 10-amp RMS motor contactor (or motor starter) with a 6× transient overload, there should be enough switches coupled in parallel to carry 60 amps RMS for 10 seconds. Using point-on-wave switching to switch the MEMS switches within 5 microseconds of reaching current zero, there will be 160 milliamps instantaneous, flowing at contact opening. Thus, for that application, each MEMS switch should be capable of "warm-switching" 160 milliamps, and enough of them should be placed in parallel to carry 60 amps. On tire other hand, a single MEMS switch should be capable of interrupting the amount or level of current that will be flowing at tire moment of switching. According to example embodiments, a motor starter including the features described above is illustrated in FIG. 5.

Figure 5:
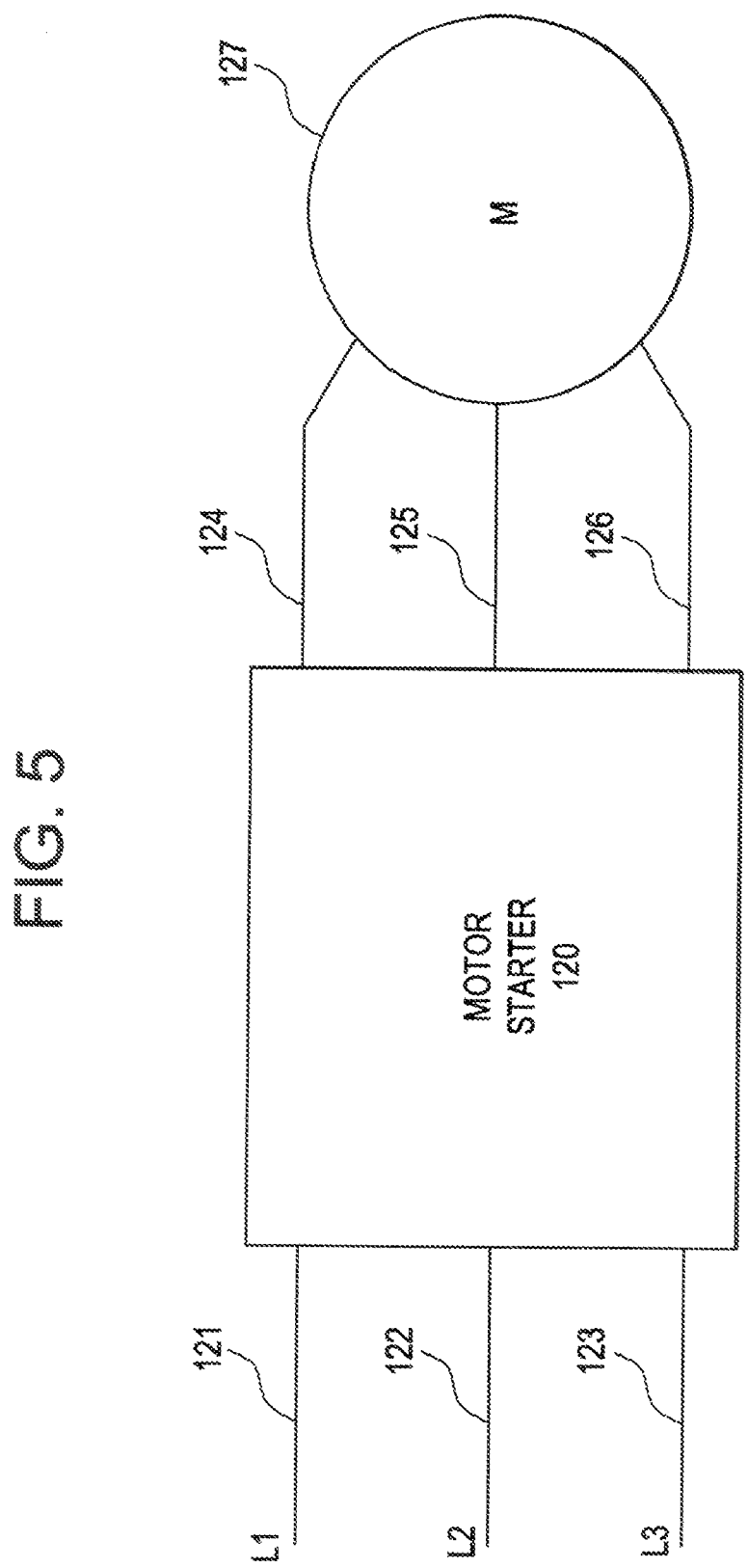
FIG. 5 is a block diagram of a motor starter configuration in accordance with an example embodiment of the invention.

Turning to FIG. 5, motor starter 120 is operatively connected to motor 127. As further illustrated, three-phase power is fed into motor starter 120 to power motor 127. Phase line L1 121, phase line L2 122, and phase line L3 123 may be, for example, connected to contacts of MEMS switching circuitry of motor starter 120. Similarly, motor leads 124, 125, and 126 may be connected to contacts of the MEMS circuitry on opposite ends compared to the three phase lines. Therefore, motor control may be facilitated through opening and closing of the contacts of the MEMS switching circuitry, it is noted however, that although motor starter 121) has been illustrated as a three-phase motor starter, other forms may be taken without, departing from the scope of example embodiments. For example, motor starter 120 may also be embodied as a single-phase motor starter, a direct current motor starter, and/ or may be included with multiple motor starters or other devices as well, depending upon particular implementations.

Figure 6:
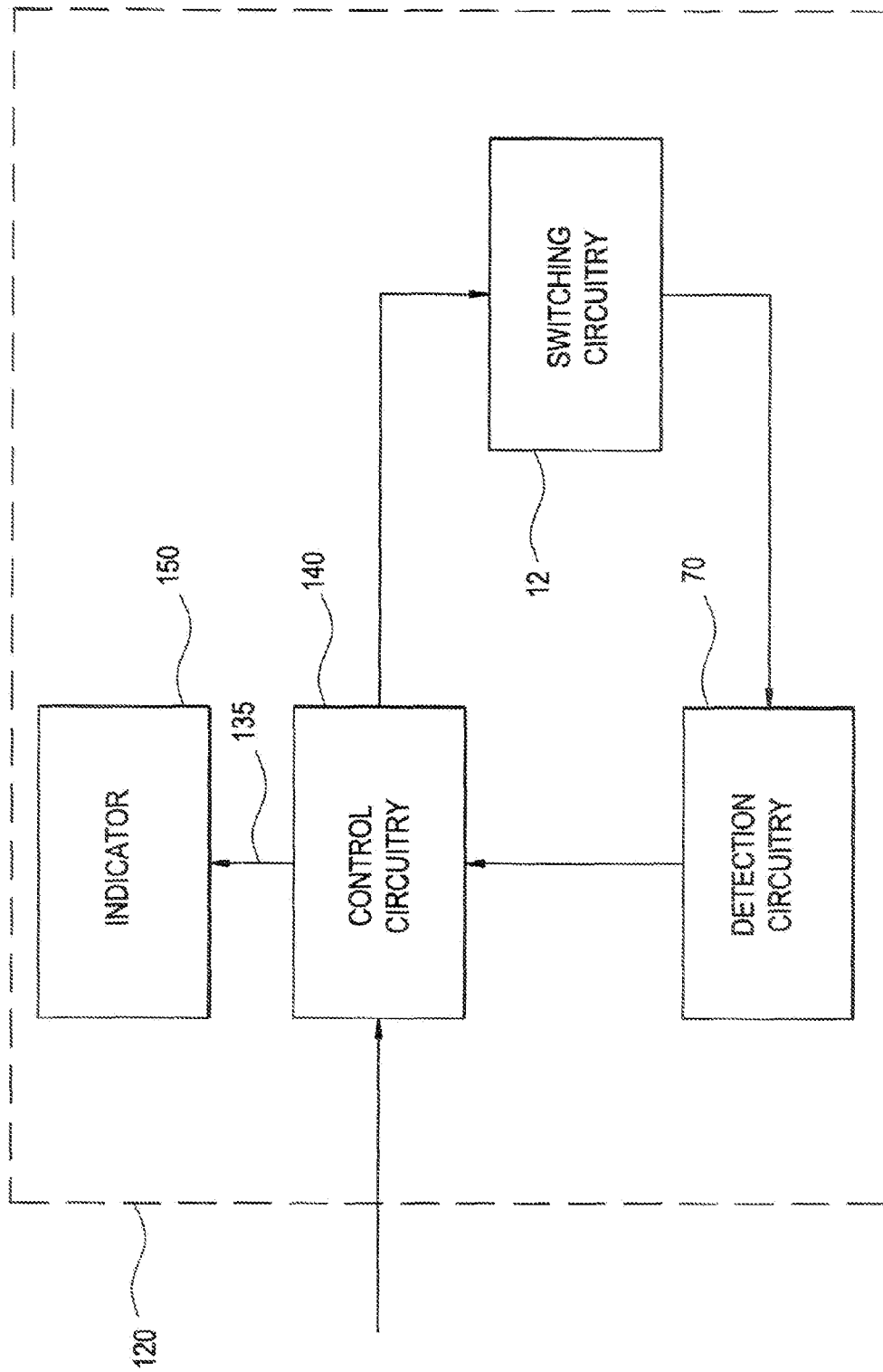
FIG. 6 is a block diagram illustrating the exemplary motor starter of FIG. 5 in accordance with embodiments of the invention.

With further regards to motor 127, it is understood that a variety of issues may arise in operation of the motor 127. For example, issues with a motor may include short circuits, phase imbalance problems, phase loss during motor operation, current spikes, exponential current level increase, current level decrease, and/or other similar issues. It is also understood that most or all of issues associated with motor 127 may be detected or at least anticipated through monitoring of current supplied to motor 127. For example, the issues noted above are characteristics of current/voltage In a current path. If the motor is connected to the current path, and any one of these characteristics are monitored, it follows that an issue with the motor has arisen. Examples of conditions which may be interpreted from the above characteristics may include motor stall, motor jam, short circuits at the motor, motor winding failure, motor bearing wear-out, and/or current leakage at the motor. For example, a motor stall may be detected through a rapid or a relatively rapid increase in current as a motor is started, further, motor bearing wear-out may be detected through a roughly exponential increase in average current over a period of time. Motor jam may be detected through high or relatively high current levels during motor operation. Other motor issues may be detected through similar or different interpretations of current/voltage characteristics depending upon particular implementations. However, specific calculation methods for particular motor issues will be omitted herein for the sake of brevity. Therefore, as described above, control circuitry integrally arranged with a current path to motor 127 may interpret characteristics of current on the current path, and may therefore determine issues with motor 127. FIG. 6 illustrates a more detailed view of the arrangement of circuitry of the exemplary motor starter of FIG. 5, including control circuitry of the exemplary motor starter.

As illustrated in FIG. 6, motor starter 120 includes control circuitry 140 and switching circuitry 12. For example, switching circuitry 12 illustrated in FIG. 6 is substantially similar to switching circuitry 12 illustrated in FIG. 1 Furthermore, switching circuitry 12 includes at least one MEMS switch to facilitate control of current on one current path. Switching circuitry 12 may also include a plurality of MEMS switches, as described hereinbefore, to allow control of current under various conditions. Control circuitry 140 may be somewhat similar to control circuitry 22, but includes additional logic circuitry to provide early warning motor protection. The additional logic circuitry is described with reference to FIG. 7.

As further illustrated in FIG. 6, art exemplary embodiment of motor starter 120 includes detection circuitry 70, Detection circuitry 70 may be substantially similar to detection circuitry 70 of FIG. 3. Therefore, motor starter 120 may detect current and current levels through detection circuitry 70. Additionally, it is noted that motor starter 120 may include additional detection circuitry, to allow for multiple phase current detection/monitoring or other similar arrangements. For example, additional current sensors, voltage sensors, etc, may be included to detect current/voltage levels on different phases of a multi-phase arrangement. Also illustrated in FIG. 6 is indicator 150, operatively connected to control circuitry 140.

Indicator 150 may include a means to indicate data pertaining to a status of current on a current path controlled by motor starter 120. For example, indicator 150 may be a communication channel to communicate data to an external device. The data may be transmitted over the communication channel, and subsequently interpreted for status of the current path. For example, if a motor is connected to the current path, the characteristics of current on the current path provide indication of the status of the motor. Therefore, using indicator 150, the motor starter 120 may provide early warning detection of issues with a motor.

Alternatively, indicator 150 may include an indicator lamp, or light, to signal the status of the current path. For example, if the characteristics of current on the current path provide evidence of an issue with a motor, the indicator lamp may change color. Depending upon the value of the color, different, issues may be represented. For example, a green color may represent an operable motor, a yellow color may represent a small issue with an otherwise operable motor, and a red color may represent a serious issue with a motor. However, the examples given above are to be considered illustrative only, and thus should not be limiting to embodiments of the invention Additionally, indicator 150 may include both a communication means and a visual indication such as the lamp example given above. For example, indicator 150 may transmit motor status over a communication channel and provide visual feedback of motor status as well. Other combinations of the features of indicator 150 are also applicable. Thus the particular examples given herein are intended to be illustrative only, and not limiting of example embodiments.

As noted above, control circuitry 140 may include additional logic circuitry to monitor current on a current path controlled by the motor starter 120. Hereinafter, a more detailed description is given with reference to FIG. 7.

Figure 7:
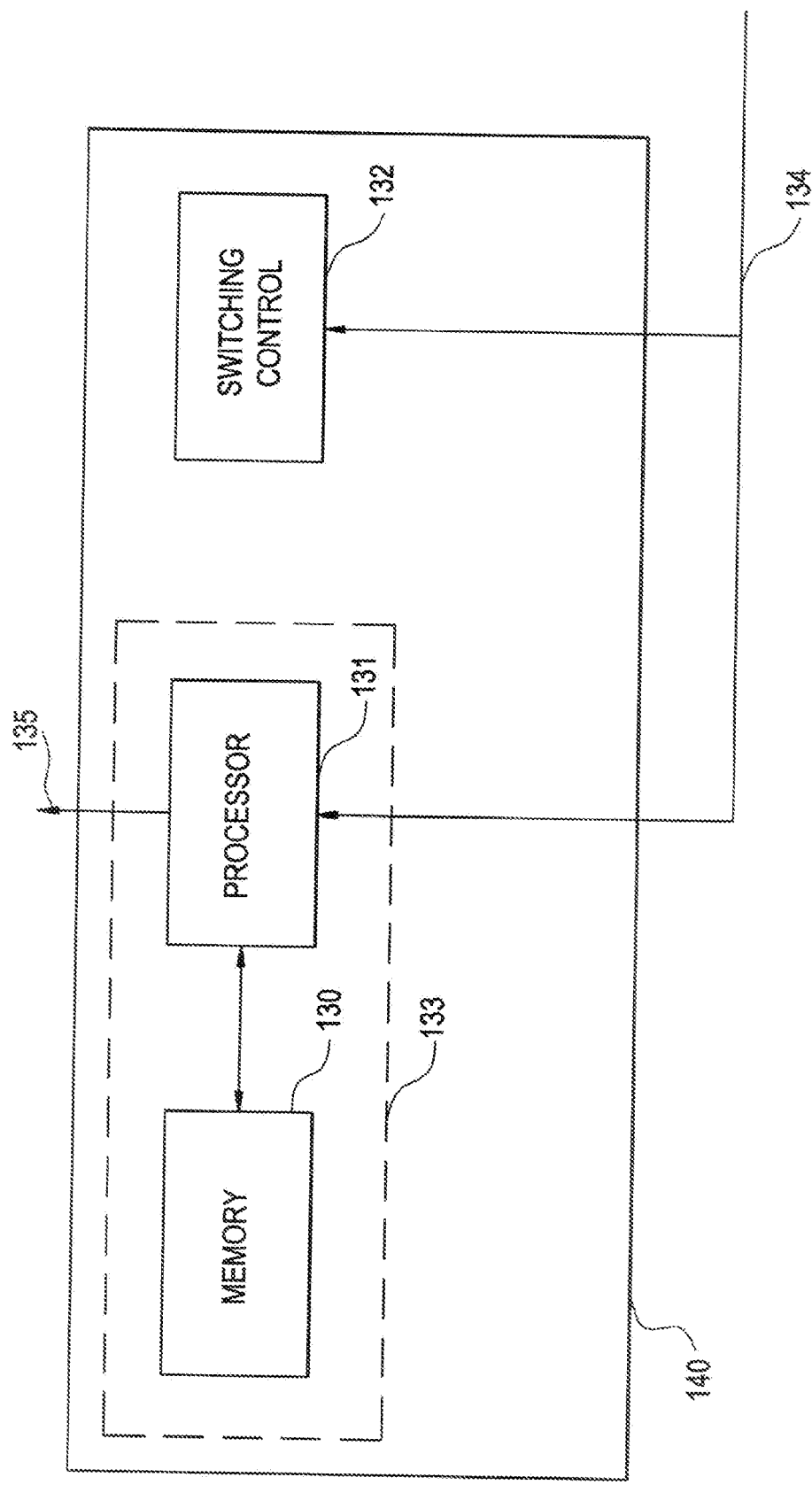
FIG. 7 is a block diagram of control circuitry of an exemplary motor starter in accordance with an embodiment of the invention.

FIG. 7 is a block diagram of control circuitry 140 for a motor starter in accordance with an embodiment of the invention. As illustrated in FIG. 7, additional logic circuitry F33 is included in combination with switching control circuitry 132. Switching control circuitry 132 may be similar to the circuitry 72 described with reference to FIG. 4. For example, switching control circuitry 72 provides control of MEMS switching circuitry. Therefore, control circuitry 140 may open and close a MEMS switch (for example, MEMS switch 74 of FIG. 4), and thereby control current of a current path. Additionally, a plurality of MEMS switches may be controlled by control circuitry 140. Therefore, a plurality of current paths may be controlled by control circuitry 140.

As further illustrated in FIG. 7, additional logic circuitry 133 includes processor 131. Processor 131 may be a computer processor capable of processing algorithms and computer executable code. The processor Eli may be operatively connected to memory 130, and may therefore be capable of accessing information contained thereon. For example, memory 130 may store a plurality of algorithms, lire plurality of algorithms may be accessed and processed by processor 131. Furthermore, results of the algorithms may be output via channel 135. Channel 135 may take a variety of forms, and should not be limited to any particular type of channel. For example, channel 135 may be operatively connected to indicator 150 of FIG. 6. Therefore, operation results of an algorithm processed by processor 131 may be output to indicator 150 over channel 135. Furthermore, memory 130 may store historical performance data related to current characteristics and/or motor performance. For example, the historical performance data may be data recorded over the lifetime of a motor or a statistical set of data on similar motors obtained from testing. Similarly, memory 130 may store empirical data relating to current conditions indicating a fault condition of a motor. Therefore, processor 131 may access the empirical data and/or historical performance data, arm use said data in calculations of the plurality of algorithms to determine a variety of other issues with a current path.

Electrical connections 134 are also illustrated in FIG. 7. The electrical connections 134 may be connections to detection circuitry for detection of characteristics of current and voltage on a current path. For example, the electrical connections 134 may be connected to detection circuitry 70 illustrated in FIG. 6. Therefore, processor 131 may use information pertaining to characteristics of a line and load current/voltage on a current path in the algorithms processed thereon. As such, processor 131 is capable of providing data pertaining to a motor connected to the current path, it follows that processor 131 is therefore capable of providing early wanting motor protection as described hereinbefore.

For example, current supplied to a motor controlled by an exemplary motor starter described herein may be detected through detection circuitry (for example, detection circuitry 70 of FIG. 6). Characteristics of the current detected may be transmitted to processor 131. Subsequently, or alternatively at substantially the same time, the processor 131 may include the characteristics in algorithms processed thereon. The algorithms may contain instructions to calculate possible issues with the characteristics of the current/voltage, or data pertaining to the characteristics of the current/voltage. Results of the instructions may be transmitted to an indicator (for example, indicator 150 of FIG. 6). Through interpretation of the indication (for example, data transmitted to an external device or indicator lamp) motor issues or faults may be identified. Therefore, according to example embodiments of the present invention, early warning motor protection may be provided by the exemplary motor starters described herein.

Hereinafter, a method of early warning motor protection is described. According to embodiments of the present invention, a motor starter including a processor is provided. The processor is capable of processing algorithms to calculate possible motor issues from characteristics of current/Voltage. Turning to FIG. 8. the method of early warning motor protection is illustrated in detail.

According to FIG. 8, the processor of the exemplary motor starter may receive information pertaining to and/or characteristics of, current on a current path controlled by the exemplary motor starter in Step 170. For example, detection circuitry on the motor starter may provide information about the line and load current/voltage on the current path to tire processor. The information provided may include current level, voltage level, and/or other similar information including the current characteristics described above with reference to FIG. 5. As described hereinbefore, motor status and/or performance may be monitored based on current supplied to the motor. Therefore, motor performance and/or motor issues may be detected based upon the information provided by the detection circuitry.

Subsequent to receiving the information, the processor may calculate possible issues with the motor based upon to the received information in Step 171. For example, an algorithm processed by the processor may include the information in the form of variables or other logic instruction arguments. The algorithm may contain instructions to manipulate this data to detect motor performance issues and/or issues with the motor. Therefore, through calculation of the received information, possible issues with the motor may be detected.

In Step 172, historical performance data may be stored. For example, performance data pertaining to the motor may be based upon the received information. The information may then be stored for future use or interpretation as described below with reference to Step 173.

In Step 173, possible performance issues or issues with the motor may be calculated based upon the stored historical performance data. For example, the level of current used by the motor may be tracked to detect any spikes or sharp increases. Alternatively, the level of current used by the motor may be tracked to detect any changes in current level. Such tracking techniques may be used in combination with other techniques to detect possible motor issues.

It is noted that although the method described above with reference to FIG. 8 includes all of Steps 170, 171, 172, and 173, any combination of the referenced steps may be used. Similarly, although the steps are illustrated in a particular order, any differing order may be used. For example, storage of performance history may occur before step 171. Alternatively. Step 171 may be omitted, and only Step 172 may be included. All other such omissions and combinations are intended to be included in the scope of example embodiments of the present invention.

While the invention has been described with reference to exemplary embodiments, it will be understood by those skilled in the art that, various changes may be made and equivalents may be substituted for elements thereof without departing from the scope of the invention, in addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, bin rather the terms lush second, etc. are used to distinguish one element from another. Furthermore, the use of the terms a, an, etc, do not denote a limitation of quantity, but rather denote the presence of at least one of the referenced item.

What is claimed is:

1. A motor starter comprising:
   control circuitry integrally arranged with at least one current path;
   a processor included in the control circuitry;
   a micro electromechanical system (MEMS) switch disposed in the at least one current path, the MEMS switch responsive to the control circuitry to facilitate control of an electrical current passing through the at least one current path; and
   a soft-switching circuit to synchronize a change in state of the MEMS switch with an occurrence of a zero crossing of at least one of an alternating electrical current passing through the at least one current path and an alternating voltage of the at least one current path relative to an absolute zero reference.

2. The motor starter of claim 1, further comprising:
   at least one processor algorithm residing at the processor, the at least one processor algorithm containing instructions readable and executable by the processor to monitor characteristics of the electrical current in the at least one current path, and to provide data pertaining to an operational condition associated with the at least one current path.

3. The motor starter of claim 2, wherein the control circuitry further includes a memory device configured for storing the data pertaining to the condition of the at least one current path.

4. The motor starter of claim 3, wherein the memory device includes a plurality of information pertaining to empirical current conditions indicating a fault condition of a motor on the at least one current path.

5. The motor starter of claim 3, wherein the memory device includes a plurality of processor algorithms containing instructions readable and executable by the processor to determine a plurality of different fault conditions of a motor on the at least one current path.

6. The motor starter of claim 5, wherein the processor processes the plurality of processor algorithms to provide data pertaining to the plurality of different fault conditions.

7. The motor starter of claim 2, wherein the characteristics of the electrical current include at least one of phase loss, phase imbalance, current level increase, exponential current level increase, and current level decrease.

8. The motor starter of claim 2, wherein:
   the at least one current path is one of a plurality of current paths;
   each current path of the plurality of current paths is integrally arranged with the control circuitry; and
   the at least one processor algorithm contains instructions to monitor characteristics of each current in each of the plurality of current paths.

9. The motor starter of claim 8, wherein:
   the MEMS switch is one of a plurality of MEMS switches corresponding to a respective one of the plurality of current paths; and
   each MEMS switch of the plurality of MEMS switches is responsive to the control circuitry to facilitate the control of an electrical current passing through a respective one of the plurality of current paths.

10. The motor starter of claim 2, wherein the condition of the at least one current path includes at least one of motor stall, motor jam, short circuit, winding failure, bearing wear-out, and current leakage of a motor on the at least one current path.

11. The motor starter of claim 2, further comprising an indicator in signal communication with the control circuitry configured to indicate the condition of the at least one current path.

12. The motor starter of claim 11, wherein the indicator is a communication channel configured to communicate the condition of the at least one current path.

13. The motor starter of claim 11, wherein the indicator is an indicator lamp disposed for visual indication of the condition of the at least one current path.

14. The motor starter of claim 1, further comprising a Hybrid Arcless Limiting Technology (HALT) arc suppression circuit disposed in electrical communication with the MEMS switch to receive a transfer of electrical energy from the MEMS switch in response to the MEMS switch changing state from closed to open.

15. The motor starter of claim 1, further comprising a voltage snubber circuit in parallel connection with the MEMS switch.

16. An early warning motor protection method, comprising:
   receiving information at a processor pertaining to an electrical current in a current path integrally arranged with control circuitry, the control circuitry including the processor and configured to control the electrical current with a micro electromechanical system (MEMS) switch responsive to the control circuitry;
   storing historical performance data based on the received information at a memory operatively connected to the processor;
   calculating an operational condition of the current path at the processor based on the stored historical performance data; and
   indicating the operational condition of the current path to provide early warning motor protection.

17. The method of claim 16, wherein:
   the current path supplies the electrical current to an electrical motor operatively connected to the MEMS switch.

18. The method of claim 16, wherein the indicating includes one of visually indicating the operational condition and electronically indicating the operational condition.

* * * * *